US012642163B2

(12) United States Patent
Gentili

(10) Patent No.: US 12,642,163 B2
(45) Date of Patent: Jun. 2, 2026

(54) SEEDING ASSEMBLY FOR DIRECT SEEDING

(71) Applicant: Jorge Alberto Gentili, Villa Constitución (AR)

(72) Inventor: Jorge Alberto Gentili, Villa Constitución (AR)

( * ) Notice: Subject to any disclaimer, the term of this patent is extended or adjusted under 35 U.S.C. 154(b) by 96 days.

(21) Appl. No.: 18/600,075

(22) Filed: Mar. 8, 2024

(65) Prior Publication Data

US 2025/0241233 A1    Jul. 31, 2025

(30) Foreign Application Priority Data

Jan. 25, 2024    (AR) ............................ P20240100184

(51) Int. Cl.
A01C 7/20        (2006.01)
A01C 5/06        (2006.01)

(52) U.S. Cl.
CPC .............. A01C 7/203 (2013.01); A01C 5/064 (2013.01); A01C 7/205 (2013.01)

(58) Field of Classification Search
CPC .......... A01C 5/064; A01C 7/203; A01C 7/205
See application file for complete search history.

(56) References Cited

U.S. PATENT DOCUMENTS 4,760,806 A * 8/1988 Bigbee ................... A01C 5/068
                                                      111/167

4,947,770 A * 8/1990 Johnston ................ A01B 35/28
                                                      111/167
4,986,200 A * 1/1991 Johnston ................ A01C 5/064
                                                      111/167

(Continued)

FOREIGN PATENT DOCUMENTS

CN        105722384 A  *  6/2016    ......... A01M 9/0092
CN        108521951 A  *  9/2018    ............... A01C 7/08

(Continued)

OTHER PUBLICATIONS

Team Novag, "Elément semeur NOVAG", https://www.youtube.com/watch?v=0JRb-w5P3tM, created May 8, 2016, 2 pages of screenshots (video 1).

(Continued)

*Primary Examiner* — Alicia Torres
(74) *Attorney, Agent, or Firm* — MUNCY, GEISSLER, OLDS & LOWE, P.C.

(57)                    ABSTRACT

A seeding assembly for direct seeding comprising a support attached to the chassis of a seeding machine; load generating means supported on said support, and a seeding frame supporting a coulter blade and a double disc assembly comprising two furrow opening discs, the coulter blade and the double disc assembly being in a tandem arrangement, with minimum distance or spacing therebetween, and the coulter blade being partially located within the seeding frame, wherein the seeding frame is attached to the support through a parallelogram system, and the load generating means transmit load to the seeding frame through said parallelogram system, and wherein the coulter blade is partially located within the parallelogram system allowing the load applied to the seeding frame to concentrate more on the coulter blade so that said coulter blade penetrates the soil.

13 Claims, 17 Drawing Sheets

(56)                    References Cited

U.S. PATENT DOCUMENTS

| | | | | |
|---|---|---|---|---|
| 6,237,697 | B1 * | 5/2001 | Butterfield | A01C 5/064 |
| | | | | 172/566 |
| 8,561,472 | B2 * | 10/2013 | Sauder | G01L 5/136 |
| | | | | 73/760 |
| 9,980,421 | B1 * | 5/2018 | Hammes | A01C 7/203 |
| 2012/0046838 | A1 | 2/2012 | Landphair et al. | |
| 2012/0255475 | A1 | 10/2012 | Mariman et al. | |
| 2018/0249621 | A1 | 9/2018 | Horsch | |
| 2020/0029493 | A1 | 1/2020 | Naylor et al. | |
| 2021/0251127 | A1 | 8/2021 | Pearson | |

FOREIGN PATENT DOCUMENTS

| | | | | | |
|---|---|---|---|---|---|
| CN | 118648414 | A | * | 9/2024 | A01B 49/04 |
| DE | 19923214 | A1 | * | 11/2000 | A01B 49/06 |
| DE | 202023100171 | U1 | * | 2/2023 | A01C 7/201 |
| WO | WO-03096785 | A1 | * | 11/2003 | A01C 7/06 |

OTHER PUBLICATIONS

Spinning Planet Web Design and Internet Marketing, "Cross Slot® No-Tillage Systems—Residue management" https://www.youtube.com/watch?v=COEwdQox7uk, created Apr. 23, 2010, 3 pages of screenshots (video 2).

* cited by examiner

12c

12a

12

12b

SEEDING ASSEMBLY FOR DIRECT SEEDING

FIELD OF THE INVENTION

The present invention relates to seeding devices. More particularly, the present invention is related to a seeding assembly for direct seeding.

BACKGROUND OF THE INVENTION

Excluding environmental factors, genetic factors, and seed quality, seeding machines are essential for controlling soil factors, where the seeding assembly is the heart of the seeding machine, and among the mechanical tasks it must perform are efficiently cutting the stubble; preparing a seeding band with superficial removal of 2.5 to 3 cm wide by 10 cm deep, where the seed will be placed; placing the seed with equidistant distribution and uniformity in depth; securing the seed at the bottom of the furrow, to ensure good seed/soil contact that guarantees a good percentage and uniformity of emergence; and covering the seed, ideally by providing loose soil in the form of an inverted "V" over the row, with the fewest possible air pockets.

The main objective of any seeding machine is to achieve good seeding, which can be defined as when the difference between the number of possible plants to obtain and the emerged plants is minimal, and where the separation between seeds is uniform and the time elapsed for emergence is minimal for the entire population.

It is worth noting that uniformity in the distribution and depth of seeds during seeding helps ensure that, once the germination process begins, each seed germinates and emerges within 12-24 hours. Simultaneous emergence allows each plant to have the same resources, avoiding delayed and underdeveloped plants. Conversely, a plant that emerges one hour later than its neighboring plant, on average, loses 50% of the potential ear size, and a plant that emerges two hours later than its neighboring plants can lose up to 100% of its potential size.

Plants with delayed emergence continuously lag throughout the growth cycle because they are hindered by a decrease in yield potential due to inefficient resource uptake. This lower performance of late-emerging plants is not compensated by the utilization of early-emerging dominant plants.

To perform the mechanical tasks mentioned above, mechanical assemblies attached to the structure of the seeding frame are used in the prior art, such as those described below.

The stubble is cut using a direct seeding equipment that includes a coulter blade which creates a micro-tillage in the soil. The coulter blade can have various shapes, undulations, and diameters, and it penetrates the soil cutting the stubble and generates a defined furrow bottom without exposing it and leaving a homogeneous removed zone.

To prepare the seeding band or furrow with the appropriate conditions, a furrow opener assembly with double discs is used, which defines a V-shaped furrow that with gauge wheels allows placing the seed at the depth desired by the producer according to conditions of temperature, humidity, soil density, and type and quality of seed variety to be sown.

In order to place the seed in the appropriate location, systems that can be mechanical, blowing, pneumatic, and/or electronic are used. Each of them has its advantages and suggested speeds by the manufacturer to achieve good seeding.

To ensure good contact between the seed and the soil, seed firmers are used, which can be press wheels or plastic seed press tails, each one having its advantage and working better in certain soil conditions.

To close the furrow, a furrow closer is used, which seeks to provide the necessary porosity to the furrow with a closing with proper shape and compaction to not delay seed emergence but favor it. The task of covering or closing furrows becomes more complicated when dealing with clayey and moist soils. In the prior art, there are different furrow closing wheels that can have smooth, beveled edges, or a toothed cap accessory suitable for each type of soil.

Regarding the necessary properties to generate a V-shaped seeding furrow, the soil must have an optimal degree of compaction. It is worth noting that compacted soils have lower porosity, and as compaction increases, the porous space decreases, especially the larger diameter pores occupied by air and useful water necessary for a good germination process. Additionally, insufficient weight on the gauge wheels during seed furrow formation leads to inconsistent depths, leaving seeds in different moisture and temperature conditions compared to the remaining seeds.

The absorption of water by the seed triggers a sequence of metabolic changes including respiration, protein synthesis, and reserve mobilization to complete the germination process. Seeds that do not reach the desired depth, remaining outside the moisture line and without conditions to germinate, will remain in a dormant state for a certain period until, at a certain point, they lose the ability to germinate.

Thus, it is essential to achieve proper management of the load on the seeding frames not only to ensure an adequate soil compaction but also to achieve proper seeding depth with a correct V profile of the seeding furrow. Improper load management on the seeding frames leads to late-emerging plants and, therefore, a reduction in seeding yield, making it essential to ensure proper load management.

In soils where direct seeding is applied, not only is proper load management necessary but also adequate transfer of the load to the coulter blade to ensure that the coulter blade penetrates the soil. The latter is a common problem in seeding assemblies known in the prior art where the coulter blade does not penetrate the soil, especially in hard, compacted soil. It is essential for the blade to effectively penetrate the soil not only to cut the stubble but also to generate prior tillage in the soil before the double disc operates, which is not designed to work in particularly hard soils.

In the prior art there are several devices such as those described in patent applications US 2020/0029493 A1 and WO 03/096785 A1 which, although they allow some of the necessary features to achieve good seeding, correspond to single-disc bodies, that is, to seeding frames with only one disc to open furrows, not suitable by themselves to carry out direct seeding of coarse grain that meets all the conditions listed above. In particular, these devices do not incorporate the double-disc element nor the seed firming element on the soil (necessary to ensure adequate contact between the seed and the soil, for optimal nutrient transfer with the soil). It should be noted that this type of device, that is, a single-disc seeding assembly, is widely used for broadcast seeding of fine grains where high positional accuracy in seed distribution is not needed.

Additionally, there are in the prior art seeding bodies with double disc that are mainly used for sowing coarse grains, and that to be used in direct seeding and to perform stubble cutting, as well as micro-tillage of the soil to create the seeding furrow bottom, they use external equipment to the seeding frame comprising a coulter blade, said external equipment being able to be placed either on the chassis of the seeding machine, where the weight of the seeding machine favors the coulter blade penetrate the soil, or on the seeding unit or assembly in front of and below the parallelogram system or four-bar mechanism as can be appreciated in patent application US 2012/0255475 A1.

It should be noted that the seeding assembly described in patent application US 2012/0255475 A1 does not work properly in hard soils as the coulter blade has the problem of not being able to penetrate the soil properly due to inadequate load transfer to the coulter blade to ensure it adequately penetrates the soil and achieves the necessary micro-tillage in the soil before the double disc operates.

Thus, in the prior art, there is no seeding assembly for direct seeding that simultaneously allows to be suitable for hard soils and allows not only a good management (distribution) of the load on the different elements of the seeding unit, which ensures an adequate degree of soil compaction and an adequate seeding depth, with the seeding furrow having a correct V-shaped profile but also an adequate transfer of the load to the coulter blade to achieve that the coulter blade penetrates the soil effectively.

Consequently, there is a need for a seeding assembly for direct seeding that allows to work in hard soils; adequately manage (distribute) the load on the different elements of the seeding frame, ensuring an adequate degree of soil compaction and an adequate seeding depth, with the seeding furrow having a correct V-shaped profile; and effectively transfer the load to the coulter blade so that the coulter blade penetrates the soil.

BRIEF DESCRIPTION OF THE INVENTION

Based on the foregoing considerations, the present invention provides a seeding assembly for direct seeding that allows working in hard soils; adequately regulating (distributing) the load on the different elements of the seeding frame, ensuring an adequate degree of soil compaction and an adequate seeding depth, with the seeding furrow having a correct V-shaped profile; and effectively transferring the load to the coulter blade so that the coulter blade penetrates the soil, wherein these features enable the seeding assembly to work with high efficiency in direct seeding soils and achieve high performance in sowing.

Consequently, an object of the present invention is a seeding assembly for direct seeding comprising:

a support attached to a chassis of a seeding machine;

load generating means supported on said support; and a seeding frame supporting a coulter blade and a double disc assembly comprising two furrow opening discs, the coulter blade and the double disc assembly being in a tandem arrangement, with minimum distance or spacing therebetween, and the coulter blade being partially located within the seeding frame, wherein the seeding frame is attached to the support through a parallelogram system, and the load generating means transmit load to the seeding frame through said parallelogram system, and wherein the coulter blade is partially located within the parallelogram system allowing the load applied on the seeding frame to concentrate more on the coulter blade so that said coulter blade penetrates the soil.

In an embodiment of the seeding assembly of the present invention, the seeding frame comprises at least one coupling means allowing to couple additional seeding accessories. Preferably, the coupling means allow coupling accessories selected from the group consisting of seed metering means, seed securing means, furrow closing and ridge forming means, and soil compacting and flattening means.

In an embodiment of the seeding assembly of the present invention, the seeding frame comprises depth regulating means comprising gauge wheels, a rocker arm support and regulation mechanism, and a rocker arm.

In a preferred embodiment of the seeding assembly, the depth regulating means further comprise a load sensor located in the rocker arm support and regulation mechanism that controls and regulates the load exerted by the load generating means.

In an embodiment of the seeding assembly of the present invention, the load generating means comprise a hydraulic cylinder.

In an embodiment of the seeding assembly of the present invention, the coulter blade is between 16" and 20" in diameter, preferably, 20" in diameter.

In an embodiment of the seeding assembly of the present invention, the coulter blade is attached to the seeding frame through tapered roller bearings.

In an embodiment of the seeding assembly of the present invention, the seeding frame comprises position regulating means for the coulter blade, said position regulating means comprising a plurality of vertically spaced holes.

In an embodiment of the seeding assembly of the present invention, the position regulating means allow a height difference in contact with the soil surface between the coulter blade and the furrow opening discs, wherein said height difference is between −10 mm and 76 mm, preferably, 0 mm.

In an embodiment of the seeding assembly of the present invention, the minimum distance or spacing between the coulter blade and the double disc assembly is between 10 mm and 62 mm, preferably 11 mm.

DETAILED DESCRIPTION OF THE INVENTION

Figure 1A:
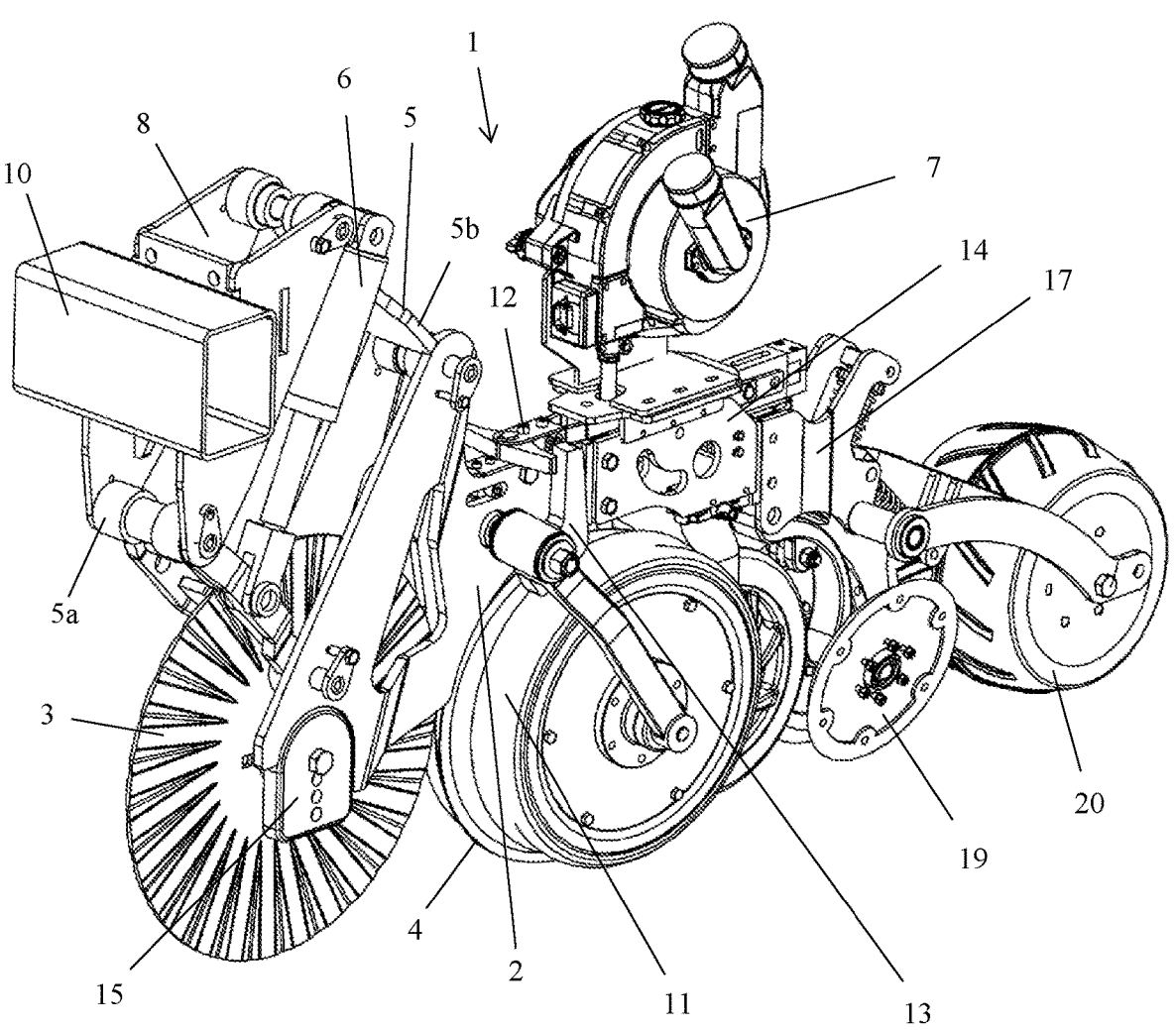
FIG. 1A shows a front perspective view of an embodiment of the seeding assembly of the present invention.
Figure 1B:
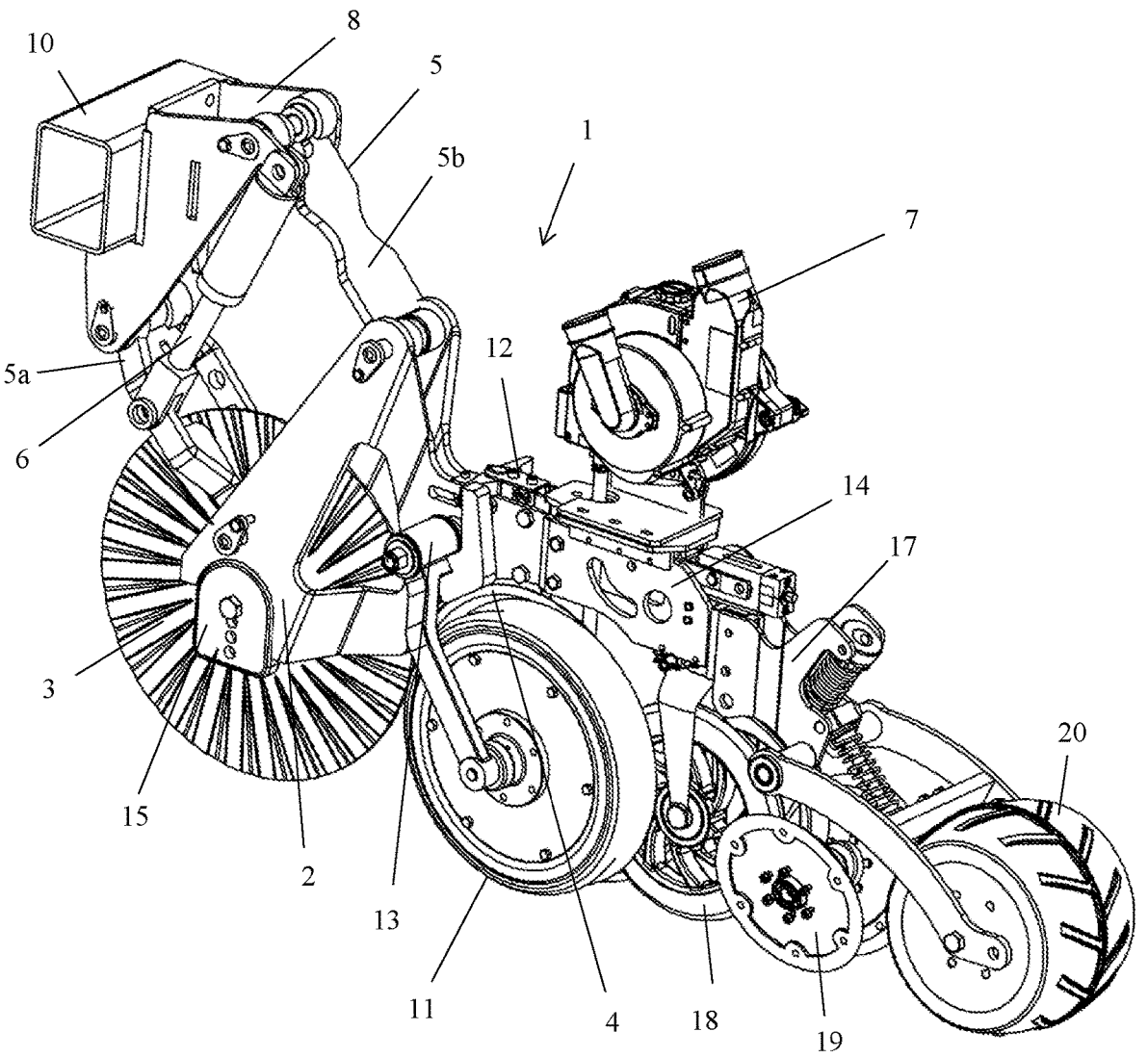
FIG. 1B shows a rear perspective view of the embodiment of the seeding assembly of FIG. 1A.
Figure 1C:
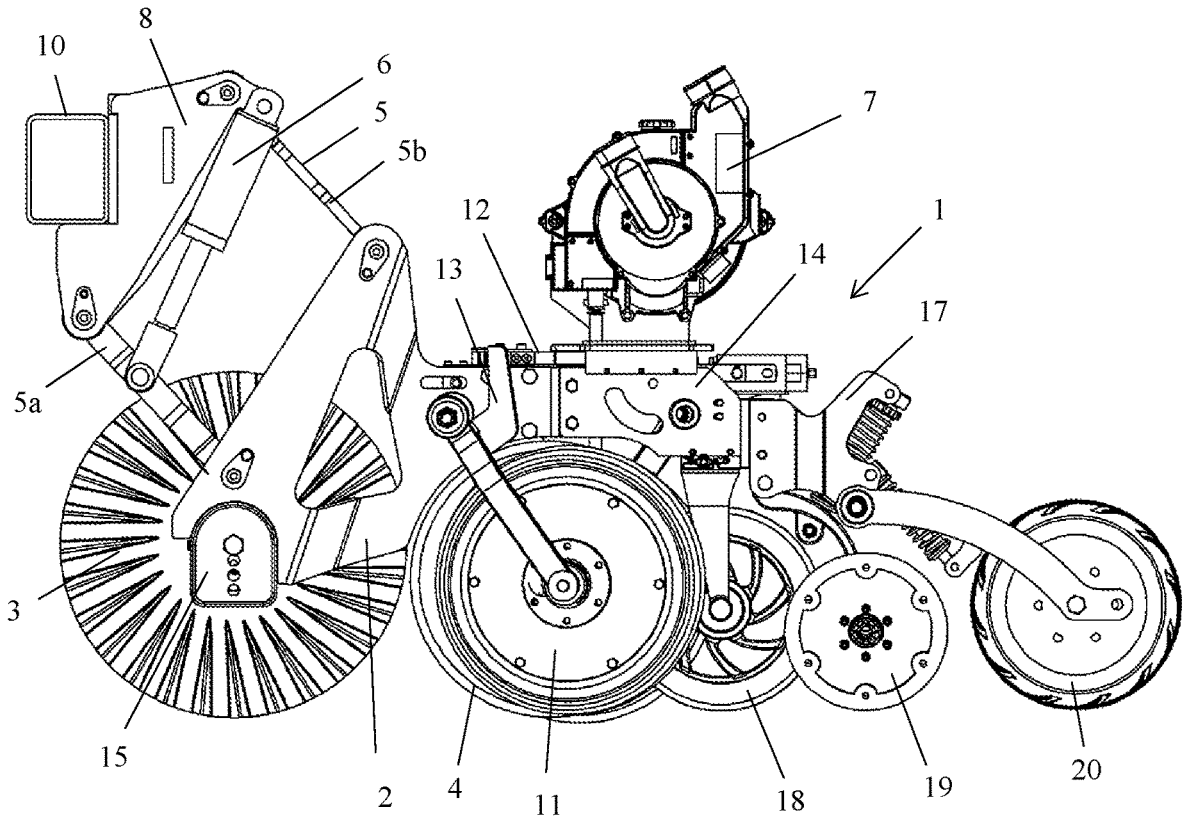
FIG. 1C shows a right side view of the embodiment of the seeding assembly of FIG. 1A.

The seeding assembly of the present invention will be described in detail below with reference to FIGS. 1A to 6B, which illustrate, by way of example, embodiments of the seeding assembly and the various elements and/or features that compose or define said seeding assembly.

The same reference numbers are used in each of the Figures to designate similar or identical elements of the seeding assembly.

Referring to FIGS. 1A to 1D, an embodiment of the seeding assembly 1 for direct seeding of the present invention can be seen, wherein said seeding assembly comprises a seeding chassis or frame 2 supporting a coulter blade (or coulter disc) 3 and a double disc assembly 4 comprising two furrow opening discs; pivot means 5; load generating means 6; seed metering means 7; a support 8 fixed to the chassis 10 of the seeding machine; and depth regulating means comprising gauge wheels 11, a rocker arm support and regulation mechanism 12, and a rocker arm, among other accessory seeding elements that will be described below.

Figure 2A:
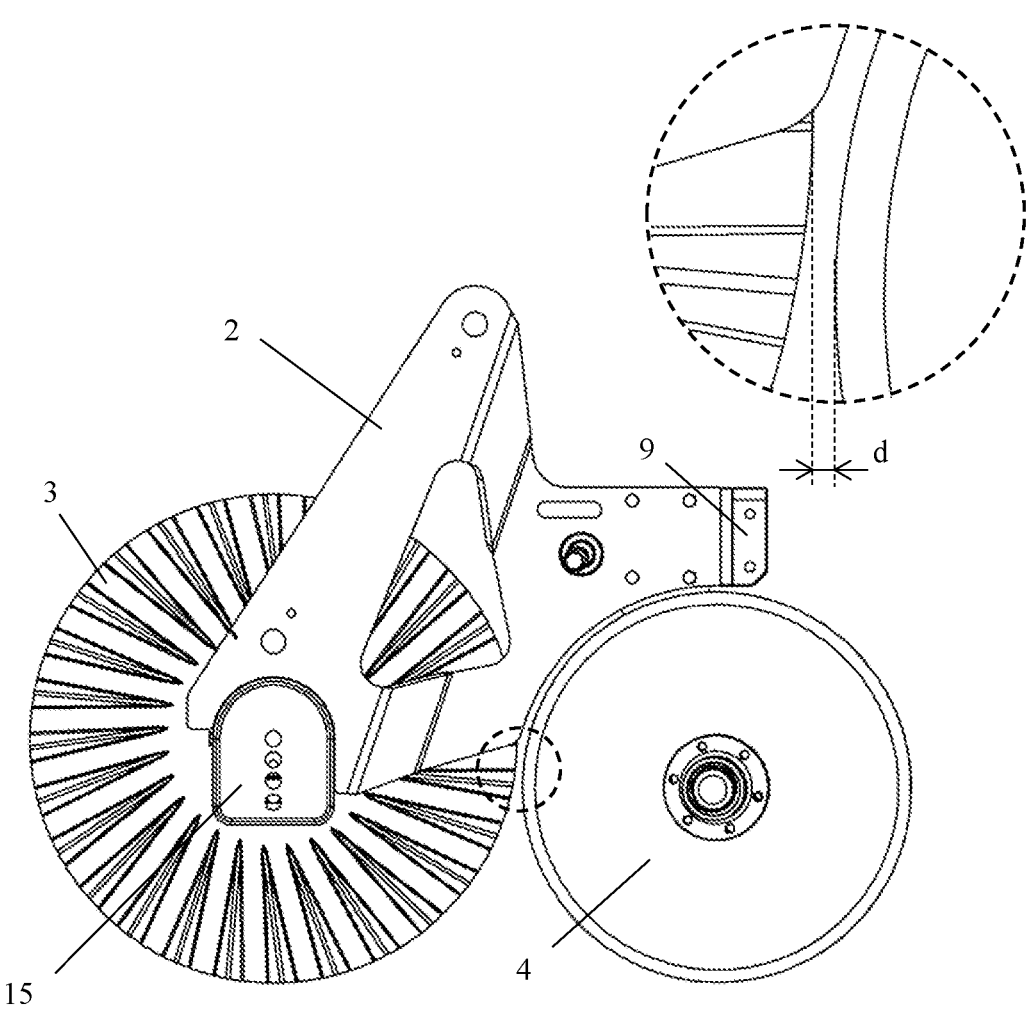
FIG. 2A shows a right side view of the seeding chassis or frame of the embodiment of the seeding assembly of FIG. 1A, wherein said seeding frame supports in tandem the coulter blade and the double disc assembly. Additionally, it shows a detailed view of the minimum spacing between the coulter blade and the discs of the double disc assembly.
Figure 2B:
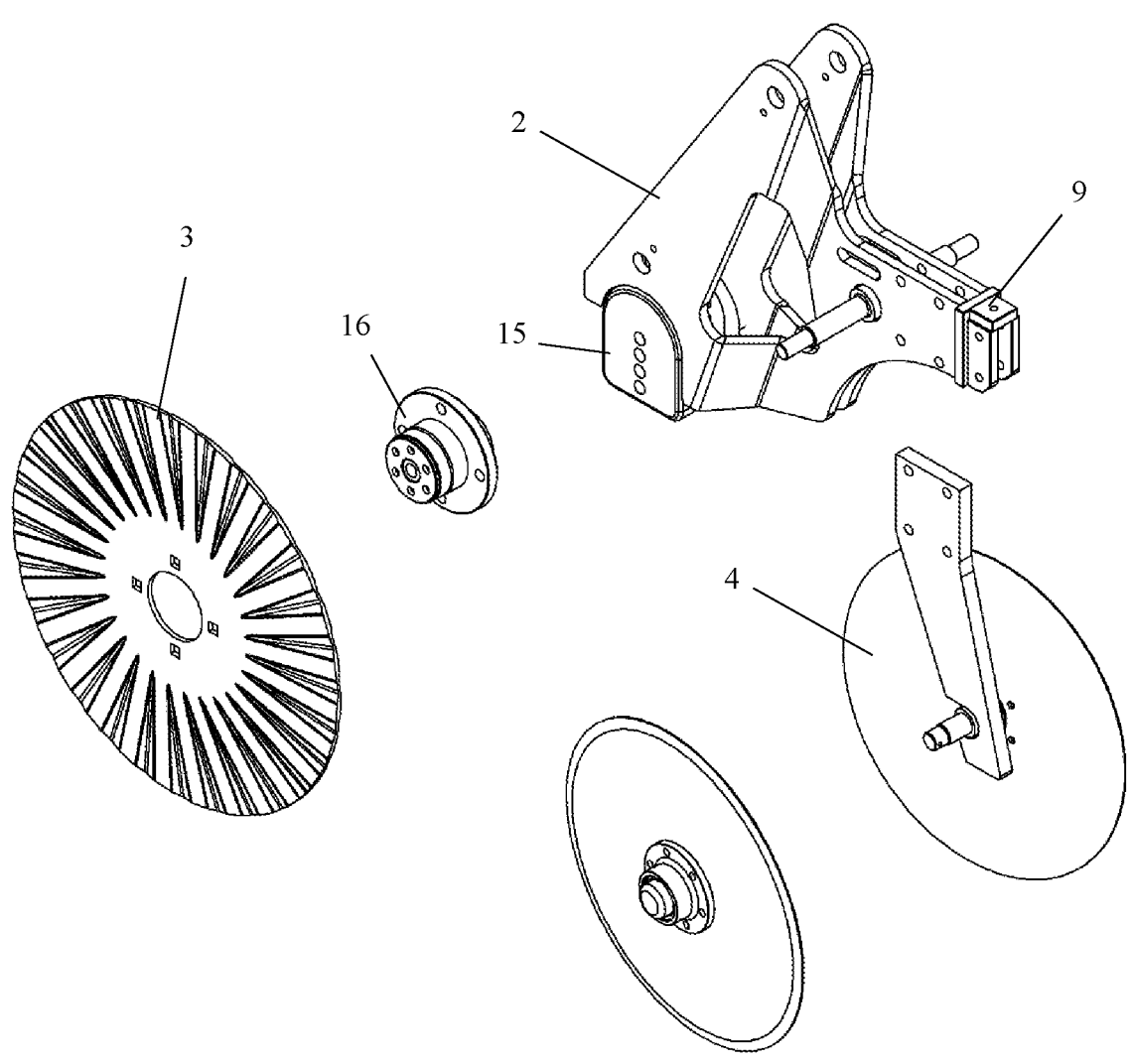
FIG. 2B shows an exploded perspective view of the seeding frame of FIG. 2A.
Figure 2C:
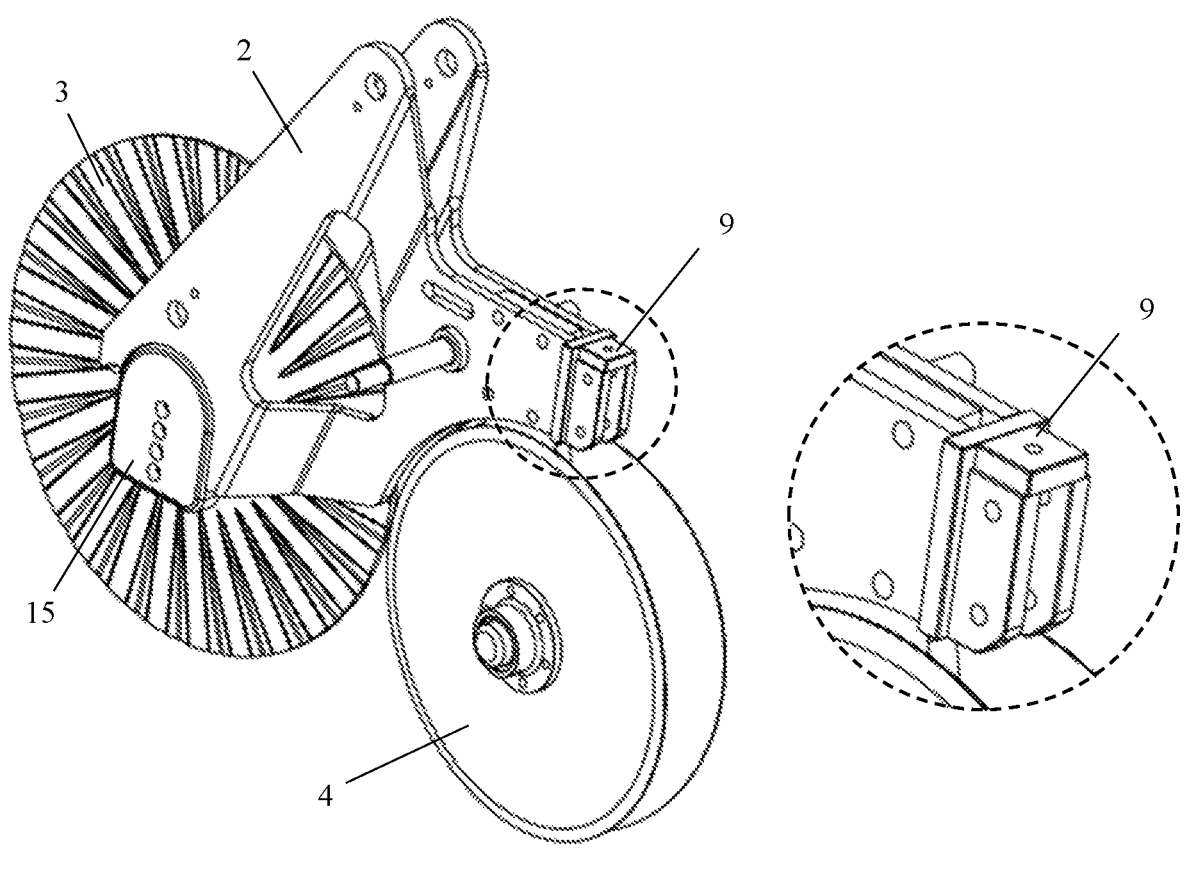
FIG. 2C shows a perspective view of the seeding frame of FIG. 2A along with a detailed view of the coupling means located in said seeding frame.

Referring in particular to the seeding frame 2 shown in FIGS. 2A to 2C, said seeding frame 2 supports the coulter blade 3 and the double disc assembly 4 in a tandem arrangement, i.e., one behind the other and attached to the same structure, with a minimum distance or spacing d between them (i.e., between the coulter blade and the furrow opening discs of the double disc assembly) of between 10 mm and 62 mm, preferably 11 mm. Thus, the seeding frame 2 has a triple disc configuration that allows the coulter blade 3 and the double disc assembly 4 to work in unison.

It should be noted that the fact that the coulter blade 3 and the double disc assembly 4 are arranged on the same chassis allows for a more effective transfer of the load from the load generating means 6 to the ground and less time spent on body regulation, as this design requires a single regulation through said load generating means 6 instead of two load regulations as required in traditional frame designs of the prior art where the coulter blade 3 and the double disc assembly 4 are not on the same frame. Additionally, the need for additional components linking said coulter blade 3 with the double disc assembly 4 is eliminated, along with the respective wear of such additional components.

Additionally, a problem that usually occurs in the seeding assemblies for direct seeding of the state of the art that have the coulter blade and the double disc assembly separated is that seeding in fields with a lot of stubble becomes difficult, as the gauge wheels 11 can become jammed, causing them to stop rotating, skid, and drag the stubble, resulting in poor seeding and, consequently, adversely affecting seeding efficiency and performance. In contrast, the seeding frame 2 of the seeding assembly of the present invention, which has the coulter disc 3 and the double disc assembly 4 arranged in tandem with minimum spacing, allows the furrow opening discs to have virtually no contact with the stubble since they are almost in contact with the coulter blade, and eliminates the possibility of the gauge wheels 11 getting jammed due to organic matter (stubble) getting stuck in said gauge wheels, resulting in the seeding assembly of the present invention having higher seeding efficiency and performance compared to seeding assemblies for direct seeding of the state of the art. Furthermore, the fact that the furrow opening discs have virtually no contact with the stubble contributes to a longer life span of said discs, i.e., to a longer lifetime due to decreased erosion.

The seeding frame 2 of the seeding assembly of the present invention comprises a first linkage means and a second linkage means, wherein the first linkage means allows to rotatably attach and support the coulter blade 3, and the second linkage means allows to attach and support a downwardly extending arm supporting at a lower end thereof each of the two furrow opening discs of the double disc assembly 4. It should be noted that the first linkage means defines an axis of rotation around which the coulter blade can rotate, and that the furrow opening discs of the double disc assembly 4 are rotatably attached to said arm, wherein the connection therebetween defines an axis of rotation around which said furrow opening discs can rotate.

The seeding frame 2 is formed by two symmetrical side plates or faces and a rear plate or face joining said two side plates, said side plates also being linked at various other points (e.g., through the pivot means, and the first linkage means). Thus, there is a space between the two side plates that allows the coulter blade to be attached to the chassis 2, since part of said coulter blade is located in said space, i.e., between both side faces of the seeding frame.

The seeding frame 2 further comprises a third linkage means and a fourth linkage means, the third linkage means being located in a lower part of the seeding frame 2 and above the first linkage means, and the fourth linkage means being located in an upper part of the seeding frame 2 and displaced relative to a horizontal direction of the third linkage means.

The third linkage means and the fourth linkage means allow the seeding frame 2 to be attached to the chassis 10 of the agricultural seeding machine pulling the seeding assembly 1 of the present invention. This is achieved through the pivot means 5, which comprise a first pivot arm 5a and a second pivot arm 5b, wherein the first pivot arm 5a is connected through one end thereof to the third linkage means and through the other end thereof to respective lower linkage means located at a lower part of the support 8 fixed to the chassis 10 of the agricultural seeding machine. Similarly, the second pivot arm 5b is connected through one end thereof to the fourth linkage means and through the other end thereof to other respective upper linkage means located at an upper part of the support 8.

It should be understood that the connection between the first pivot arm 5*a* and the second pivot arm 5*b* with both the linkage means of the support 8 and the third linkage means and the fourth linkage means of the seeding frame is through revolute joints that allow said first pivot arm 5*a* and second pivot arm 5*b* to rotate both clockwise and counterclockwise relative to said joints.

Thus, the pivot means 5 together with the linkage means of the support 8, and the third linkage means and the fourth linkage means, define a parallelogram system (also known as a four-bar mechanism or simply parallelogram) that allows the seeding assembly 1 to perfectly follow the profile of the field to be seeded and keep the seeding frame 2 parallel to the profile of the field to be seeded. Therefore, the parallelogram system is responsible for connecting and linking the support 8 with the seeding frame 2 where the ground mechanical work is performed, and for transferring the load from the load generating means 6 to the various components of the seeding frame that cut and treat the soil.

The coulter blade 3 is partially located within the parallelogram system because it is supported together with the double disc assembly 4 in the same seeding frame 2, and in a tandem arrangement where the spacing between the discs of the assembly 4 and coulter blade 3 is minimal. Thus, this location of the coulter blade 3 allows the load (force) applied through the load generating means 6 to the seeding assembly to be more directly concentrated on the coulter blade (as the coulter blade is closer to the point of application of the load of the load generating means), enabling it to penetrate more easily into soils, this being essential for the seeding assembly of the present invention to be able to work in hard soils, and thus improving the load application performance of the load generating means.

It should be noted that said load generating means 6 preferably comprise a hydraulic cylinder that generates the load, and which is linked through an upper part thereof to the upper linkage means of the support 8 and with its corresponding rod applies the load on the first pivot arm 5*a*. Preferably, the hydraulic cylinder is linked to the upper linkage means of the support 8 such that the hydraulic cylinder is slightly offset outward and laterally (either to the right or left, being on the left side, for example, in FIGS. 1A to 1D), the latter to avoid any possible collision with the coulter blade 3 when it reaches maximum elevation, so the rod applies the load on one side of the first pivot arm 5*a*. Thus, the support 8 is the element that holds the hydraulic cylinder that provides load to the seeding frame and the parallelogram system, said support 8 having for this purpose sufficient rigidity to withstand all the force generated by the seeding assembly, said force being the sum of the weight of each of the components of the seeding frame, the ground reactions on the cutting elements of the frame, and the load generated by the hydraulic cylinder.

It should be noted that, although the hydraulic cylinder is shown in the Figures slightly displaced outward and offset to one side, in cases where there will be no collision between the hydraulic cylinder and the coulter blade, said hydraulic cylinder could be centered with respect to the support 8 and have its connection with the upper linkage means of the support 8 so that it is aligned with them (i.e., they share the same axis). Thus, the rod would apply the load on the first pivot arm 5*a* at a midpoint thereof, for example, through an intermediate element that connects said rod to said first pivot arm 5*a*.

Both in the connection of the first pivot arm 5*a* to the lower linkage means of the support 8 and the third linkage means of the seeding frame 2, and in the connection of the second pivot arm 5*b* to the upper linkage means of the support 8 and the fourth linkage means of the seeding frame 2, wherein such connections can be made through, for example, a shaft, roller bearings are used which allow greater durability (service life) and stability.

These roller bearings give the seeding frame a high capacity to withstand high loads with less wear on its components, enabling the seeding frame to operate at higher planting speeds. They also allow for greater efficiency in load transfer due to the combination of lower friction and wear at high speeds. The use of roller bearings implies an advantage over the parallelogram systems used in the prior art since they use wear bushes and, therefore, do not allow operation at higher planting speeds as their lifespan is shorter than roller bearings.

The first linkage means of the seeding frame 2 comprises position regulating means 15 on each lateral face of the seeding frame 2 and a hub 16 (as shown in FIG. 2B). The hub 16 allows rotatably attaching and supporting the coulter blade 3, and is attached to said coulter blade 3 by means of a plurality of screws, for example, 4 or 5 hexagonal head screws. On the other hand, the position regulating means 15 comprise a plurality of vertically spaced holes that not only allow the hub 16 to be connected to the seeding frame via screws but also allow this connection to be at a higher or lower height, thus being able to change the position of the coulter blade with respect to the discs of the assembly 4. It should be noted that the hub 16 comprises high-capacity tapered roller bearings, which give it high durability and allow for higher working speeds.

The seeding frame 2 allows the use of coulter blades of different sizes, a coulter blade of a certain size being selected according to the soil needs of the field where planting is to be done. In particular, the seeding frame 2 allows the use of coulter blades between 16" and 20" in diameter, being preferable the use of coulter blades of 20" in diameter, size which cannot be used in the seeding assemblies for direct seeding known in the prior art.

The fact that larger coulter blades can be used, i.e., 20" in diameter, allows for greater cutting efficiency and, therefore, allows for less material being deposited into the furrow. In other words, the use of a large coulter blade not only cuts the stubble more efficiently, but also helps to prevent the stubble from sinking into the furrow, where it would degrade upon contact with soil moisture, contaminating the furrow and creating a harmful effect on seed growth.

It should be understood that while a large blade requires greater effort to penetrate the soil (to the desired depth), this increased effort is achieved with the coulter blade located within the parallelogram system, where the load applied and transferred by the load generating means is more directly concentrated on the coulter blade. Additionally, a larger blade allows for greater durability of its active cutting edge, resulting in more hectares worked before replacement due to wear; and it has a lower rolling effort, allowing less energy expenditure to rotate when advancing and cutting the stubble, thereby removing the soil and generating an even furrow bottom.

Additionally, it should be understood that seeding assemblies known in the state of the art do not allow the use of coulter blades of 20" in diameter, as this would cause mechanical interference with other components, along with potential breakages and/or excessive wear due to increased loads not accounted for in the original design for smaller blades (up to 18" inches).

The coulter blade 3 thus allows for the cutting of stubble and the preparation of a seeding band or furrow with surface removal, said seeding band having preferably a width between 2.5 and 3 cm. Additionally, the coulter blade 3 may have a height difference in contact with the soil surface compared to the furrow opening discs of the double disc assembly 4 by means of the position regulating means 15, as previously described, wherein said height difference is between −10 mm and 76 mm, with negative values in this range indicating that the coulter blade is above the soil surface and therefore above the furrow opening discs, while positive values indicate that the coulter blade is below (or within) the soil surface and therefore below the furrow opening discs. Preferably, the coulter blade is at the same level (i.e., the height difference is 0 mm) as the furrow opening discs of the double disc assembly 4, meaning that they penetrate the soil to the same depth.

The fact that the coulter blade performs soil micro-tillage (in addition to stubble cutting) at the same level as the furrow opening discs ensures that once the seeds are deposited in the seeding furrow, the water in the furrow ascends and makes contact with the seeds, allowing them to quickly imbibe and initiate the germination process. Another advantage is that the ascending water, through the soil profile, will collide with the area micro-tilled by the coulter blade, cutting capillarity at the seed level and consequently significantly reducing water evaporation into the atmosphere, thus leaving more water available around the deposited seeds.

Once the soil micro-tillage is performed by the coulter blade, the furrow opening discs of the double disc assembly 4 cut the seeding furrow in a "V" shape, said furrow opening discs being inclined both with respect to a vertical direction and a horizontal direction as will be evident to one skilled in the art. Once the micro-tillage is generated, the gauge wheels 11 (located externally to the furrow opening discs) have a double function, the first is to control the working depth of the furrow opening discs, and the second is to generate controlled compaction to allow for the formation of furrow walls. To achieve this, the gauge wheels 11 have a depression in their tread that allows for the accommodation of a volume of soil displaced by each furrow opening disc. The purpose of this volume is to create a space where the soil displaced by the corresponding furrow opening disc is placed, compacting it as little as possible.

Figure 1D:
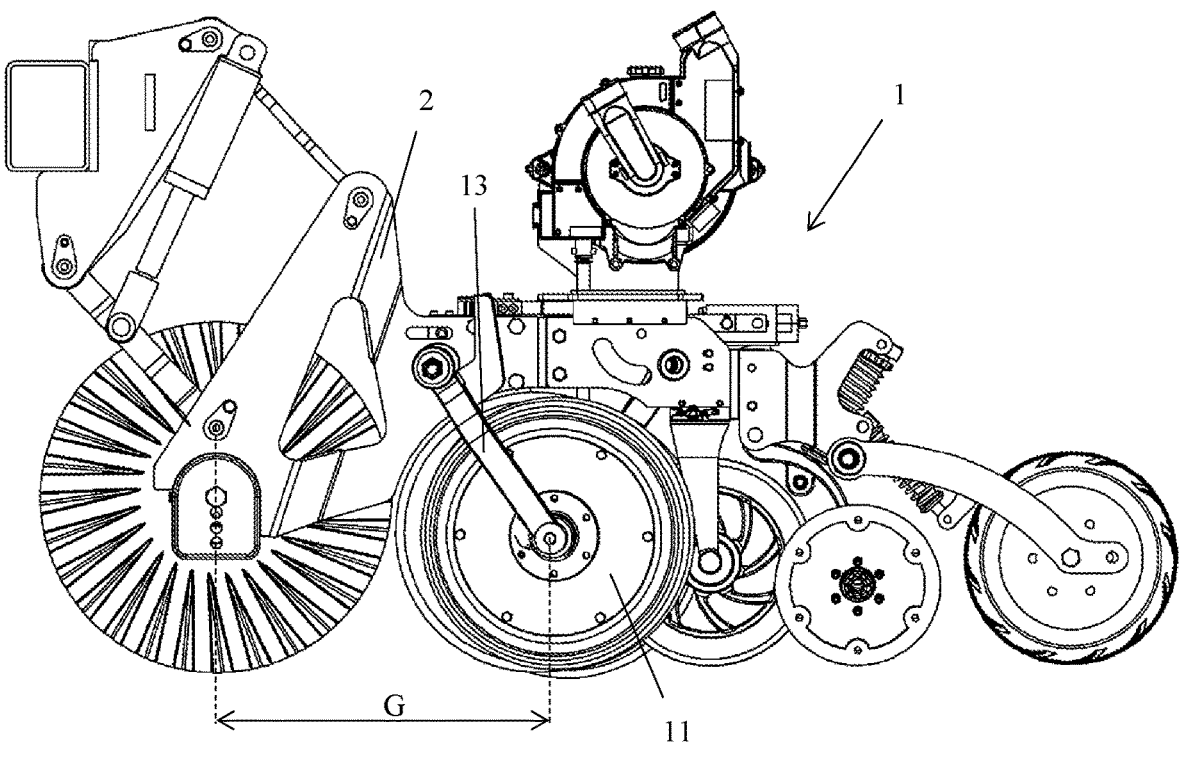
FIG. 1D shows a right side view of the embodiment of the seeding assembly of FIG. 1A illustrating the distance between the gauge wheels and the first linkage means of the seeding frame.

The depth regulating means comprise a support and pivot arm 13 that allows for the support and pivot of a respective gauge wheel, said support and pivot arm 13 being attached to a respective axle protruding from the seeding frame 2, and each support and pivot arm (on each side of the seeding frame) allowing the gauge wheels 11 to have a working range between 260 mm and 500 mm, said measurements being horizontal distances from the first linkage means of the seeding frame, i.e., these measurements being values of the distance G between the gauge wheels and the first linkage means of the seeding frame, as shown in FIG. 1D. Preferably, the gauge wheels 11 are at a distance of 483 mm from the first linkage means. It should be noted that this working range for the gauge wheels 11 allows the planting depth to be varied within a range of 100 mm. Additionally, it should be noted that when the gauge wheel is at its minimum distance with respect to the first linkage means, it allows taking more advantage of the possible removal of the soil due to the action of the coulter blade, resulting in a smaller amount of organic matter in contact with the gauge wheel, resulting in less maintenance and longer useful life.

The depth regulating means further comprise a load sensor located in the rocker arm support and regulation mechanism 12 that controls and regulates the pressure (load)

exerted by the hydraulic cylinder of the load generating means 6, so that said the pressure is variable and allows reacting to the variations in soil resistance in each area of the plot or field being planted, in order to maintain constant planting depth for even seed emergence. Thus, the depth of the furrow opening discs of the double disc assembly 4 is electronically regulated by the load sensor, which ensures that the cutting elements are maintained at the necessary height for stable planting depth.

Figure 3A:
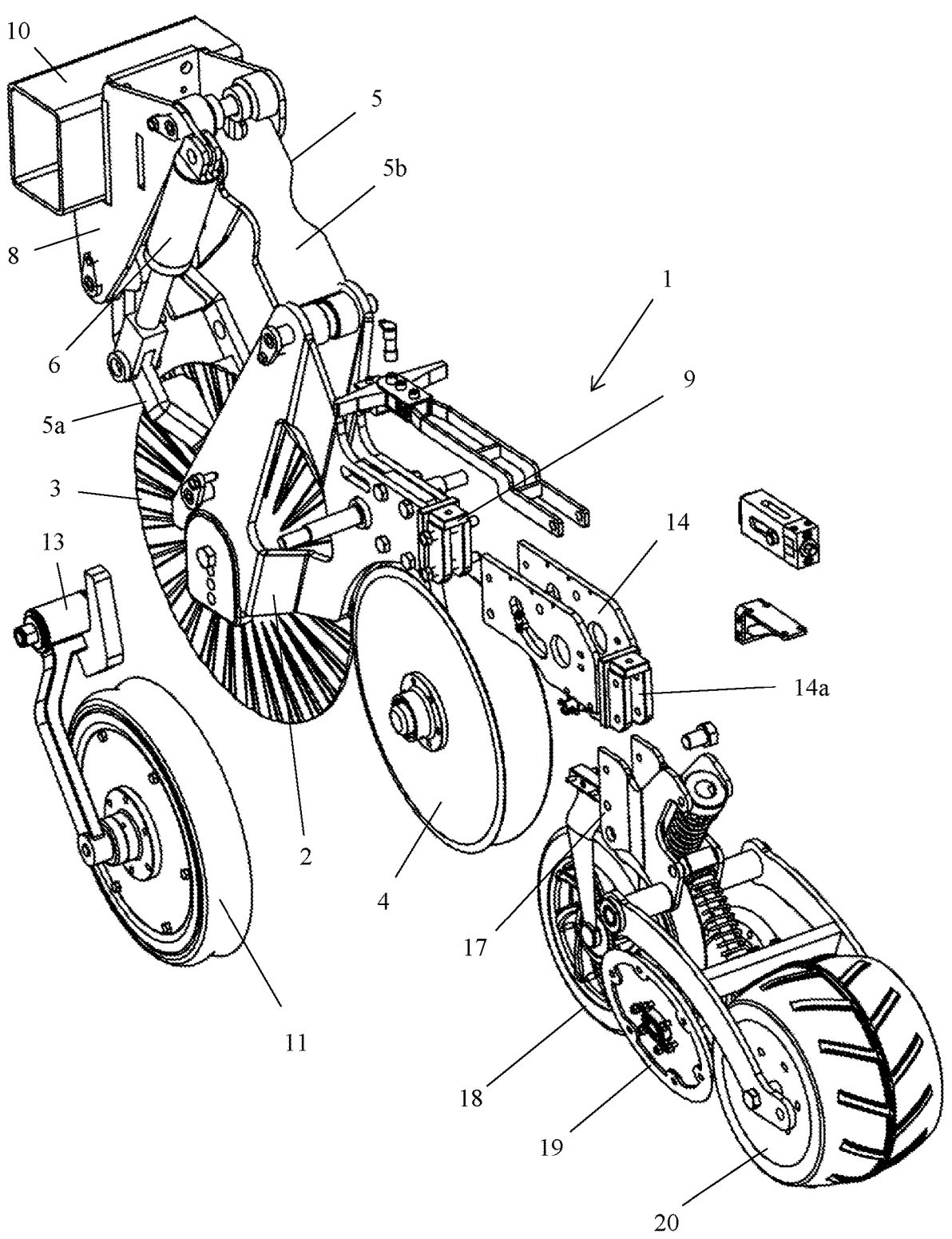
FIG. 3A shows a perspective and partially exploded view of the embodiment of the seeding assembly of FIG. 1A without the seed metering means.
Figure 3B:
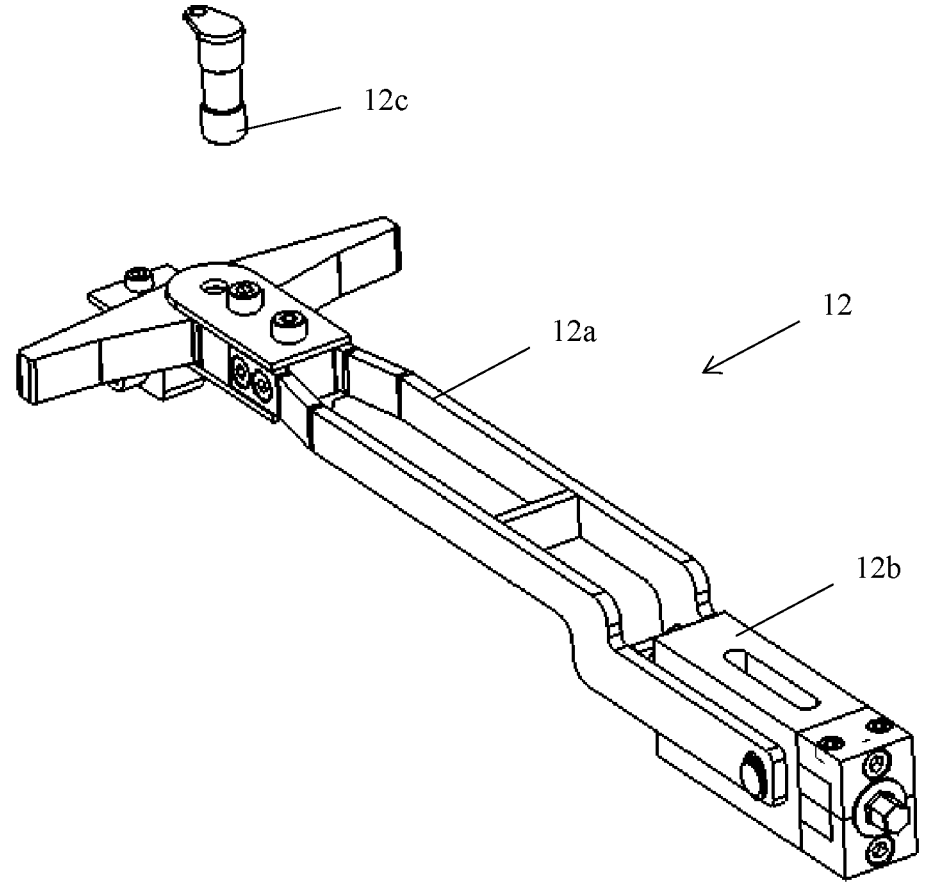
FIG. 3B shows a perspective view of the rocker arm support and regulation mechanism.

It should be noted that the rocker arm support and regulation mechanism 12 comprises, as shown in FIG. 3B, a rocker arm support structure 12a having mounted a rocker arm at one end thereof, a rocker arm regulation mechanism 12b, and a bolt 12c for mounting the load sensor.

The depth regulating means then determine the planting depth through the rocker arm mounted at the end of the support structure 12a, wherein the rocker arm makes contact at the upper end of the support and pivot arm 13 of the gauge wheels 11. Depth regulation is carried out by turning a screw located in the regulation mechanism 12b mounted at the other end of the support structure 12a. Specifically, the load sensor in the rocker arm support and regulation mechanism 12 allows to electronically control the load of the hydraulic cylinder of the load generating means 6 in order to maintain the appropriate depth when soil resistance changes in each sector of the terrain and to avoid adding extra load to compact the sidewalls of the V-shaped furrow.

Thus, the seeding assembly of the present invention allows to adequately control the seeding depth and the compaction of the sidewalls of the seeding furrow. The latter is important because soil structure has a direct relationship with the amount of water and oxygen that can be retained in a soil profile and influences microbial activity, and compacted soils have less porosity which affects the growth of roots originating from the seed and may even hinder plant development if compaction is excessive. Thus, soil density or compaction around the seed has a direct effect on emergence uniformity.

Controlling planting depth is important because seeds must not only be placed equidistant from each other, but also at an appropriate depth to avoid competition among them. When the seed is not located at the proper depth, it may be too deep, in which case the possibility of the seed receiving oxygen decreases or, if it germinates, it may deplete its oxygen reserves before emerging; or it may be too shallow, where there is a risk of soil moisture loss before germination or insufficient root establishment, leading to seedling drying out and poor establishment or the risk of plant overturning in advanced crop stages affecting yield.

Insufficient weight on the gauge wheels results in inconsistent depths, leaving seeds in different moisture and temperature conditions compared to the rest. Those seeds that do not reach the desired depth remain outside the moisture line and without conditions for germination, and will remain dormant for a certain period of time until, at a certain point, they lose the ability to germinate.

The seeding frame 2 comprises, on its rear face or plate, coupling means 9 that allows to couple a support and junction module 14 that supports the seed metering means 7, with said support and junction module 14 having coupling means 14a which allows for the attachment of additional seeding accessories such as seed securing means 18, furrow closing and ridge formation means 19, and soil compacting and flattening means 20 (as shown in, for example, FIG. 3A). In particular, each of the means 18, 19, and 20 may be linked to and supported by the support and junction module 14 or a support body 17 that is attached to said support and junction module 14 via the coupling means 14a.

Figure 4A:
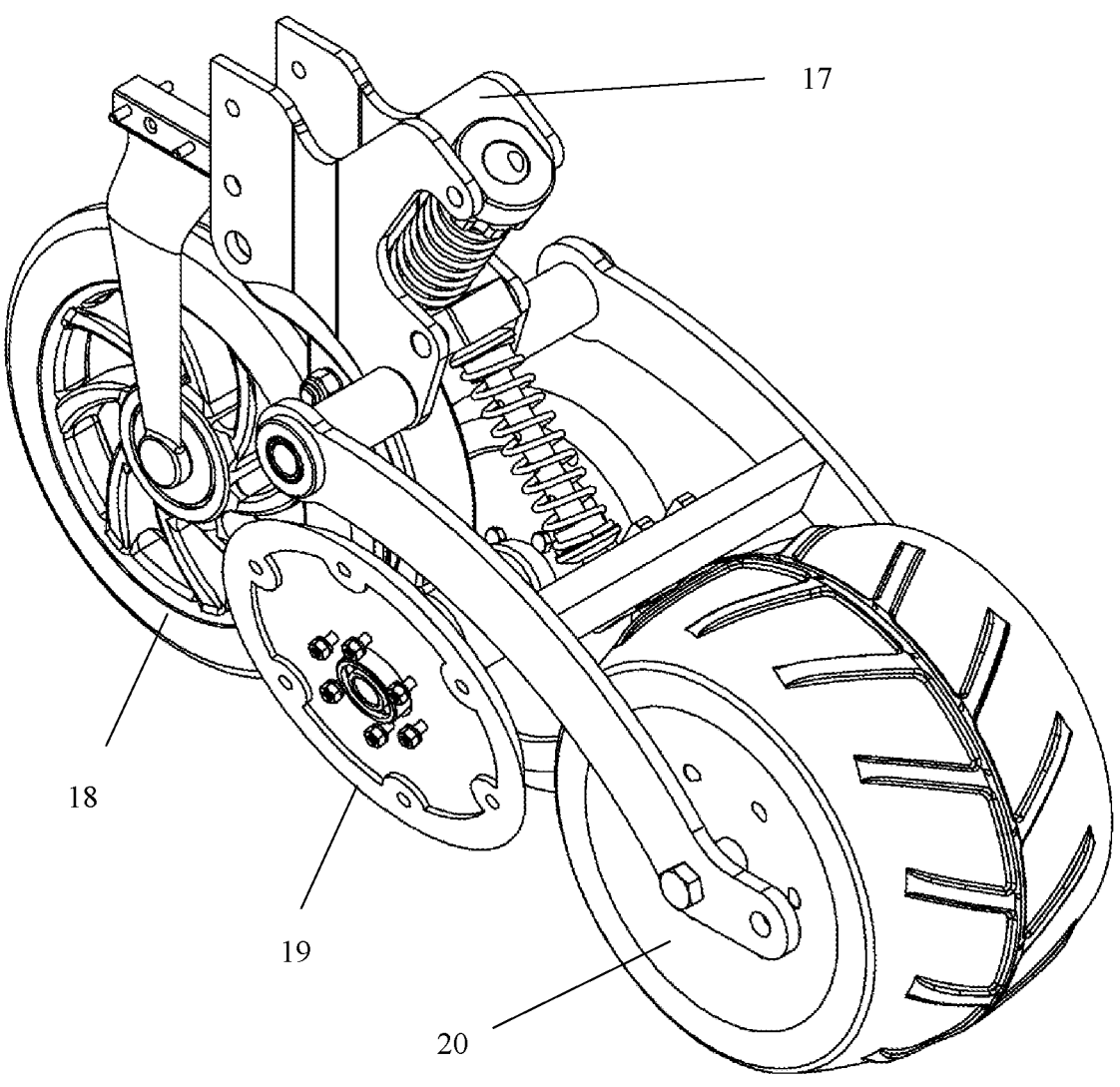
FIG. 4A shows a perspective view of a support body that supports additional seeding accessories.
Figure 4B:
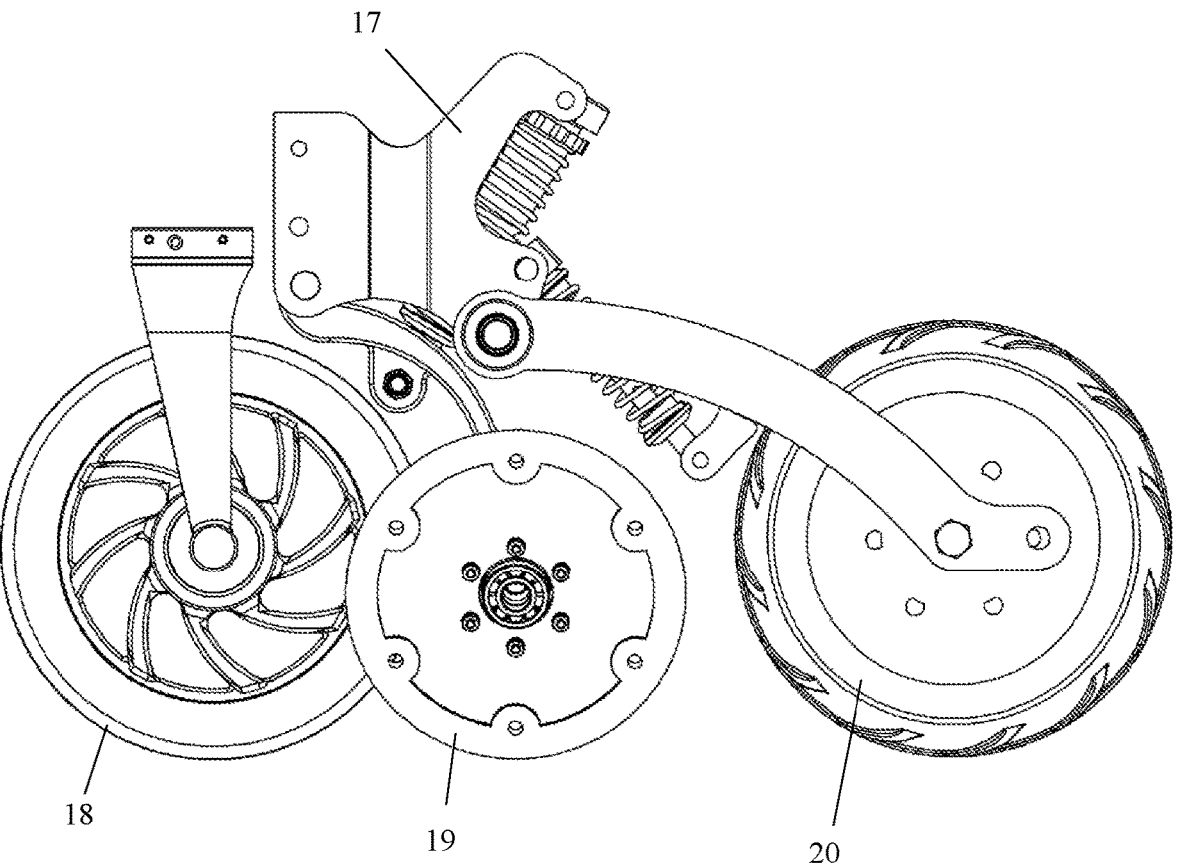
FIG. 4B shows a right side view of the support body of FIG. 4A.
Figure 4C:
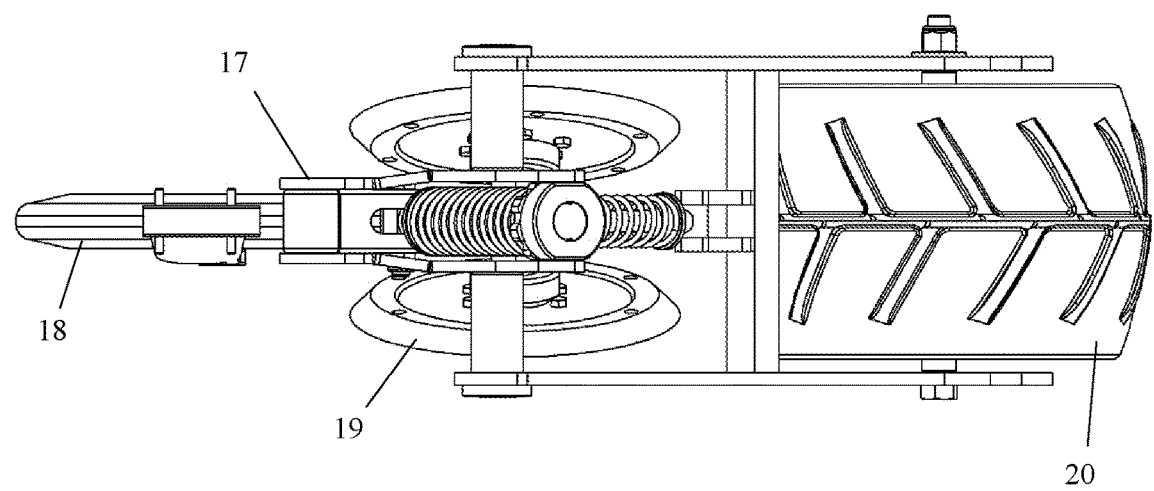
FIG. 4C shows a top view of the support body of FIG. 4A.
Figure 5A:
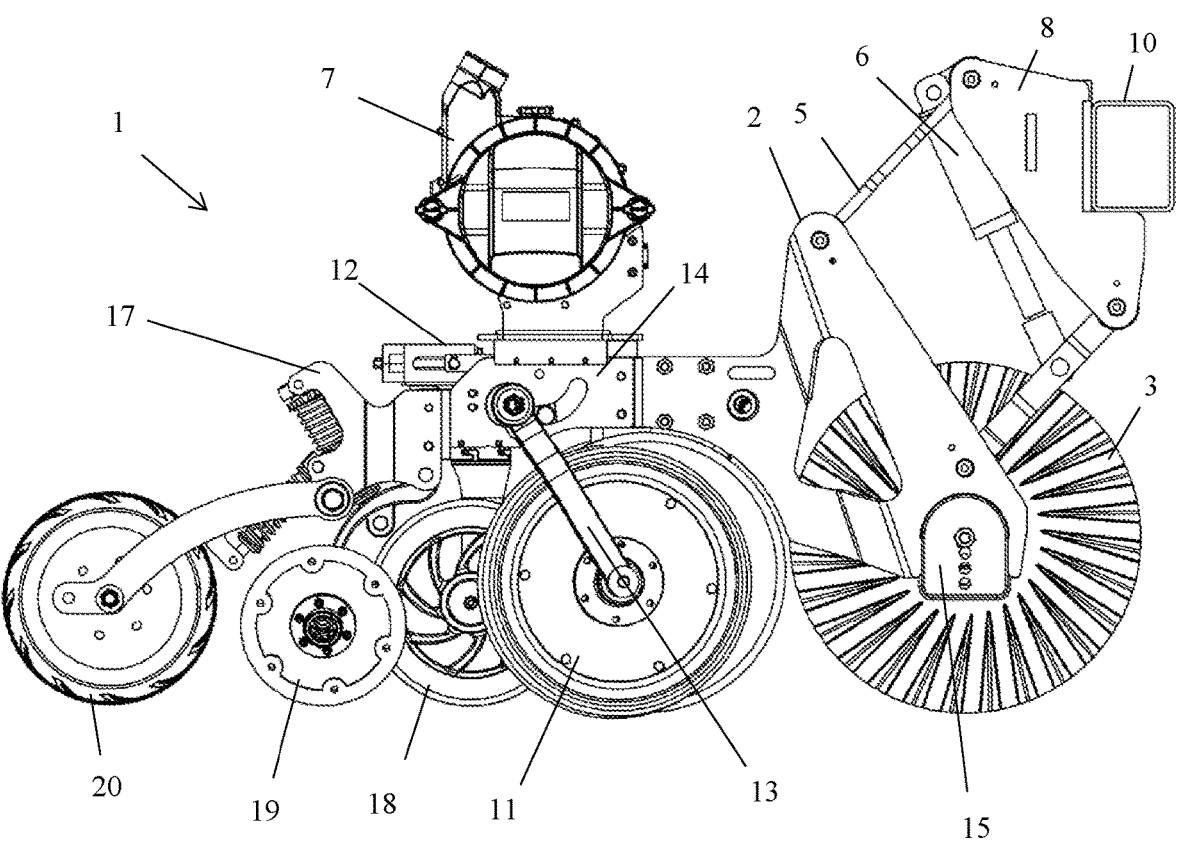
FIG. 5A shows a left side view of an embodiment of the seeding assembly of the present invention.
Figure 5B:
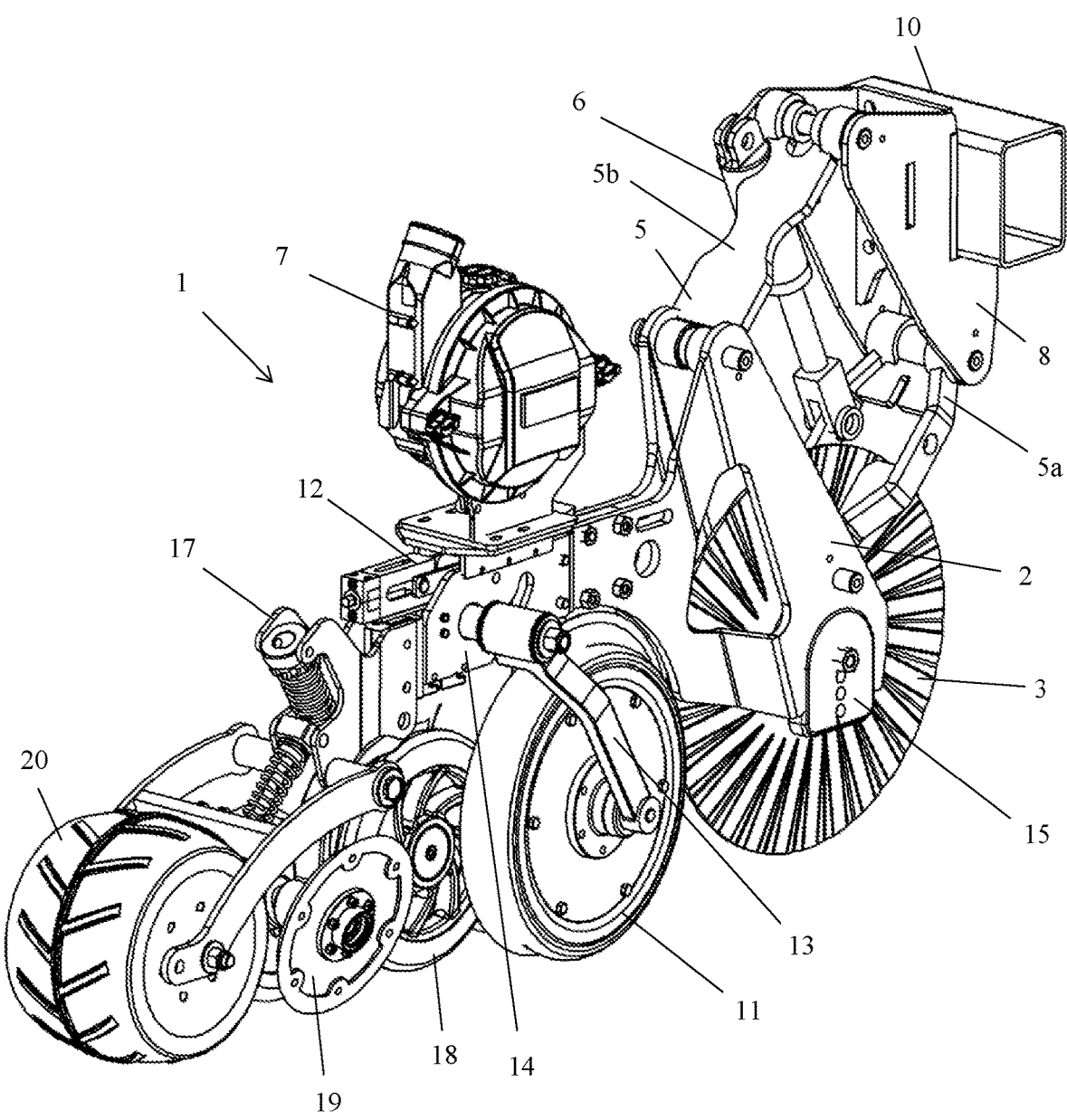
FIG. 5B shows a perspective view of the embodiment of the seeding assembly of FIG. 5A.
Figure 5C:
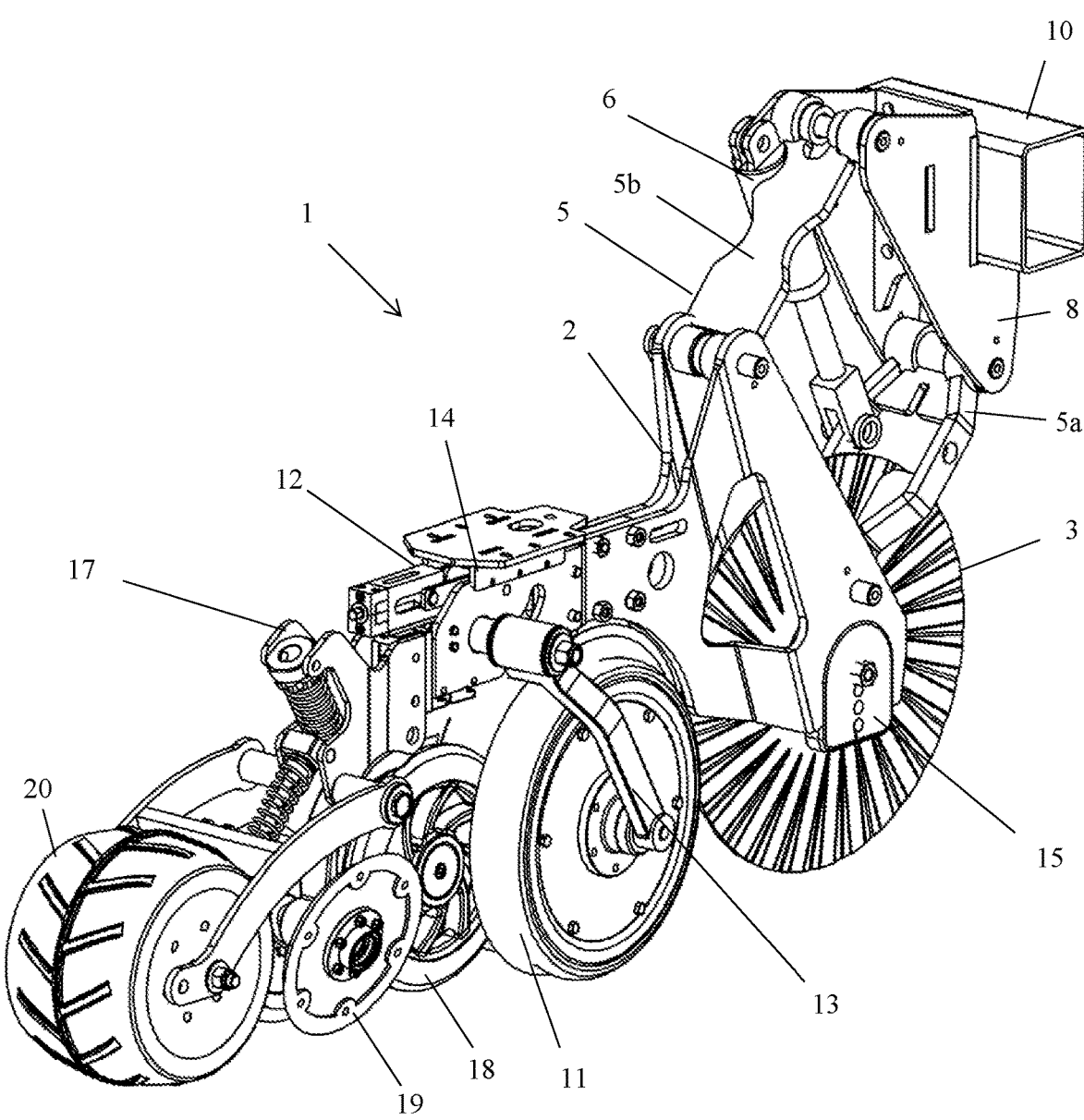
FIG. 5C shows a perspective view of the embodiment of the seeding assembly of FIG. 5A without the seed metering means.
Figure 5D:
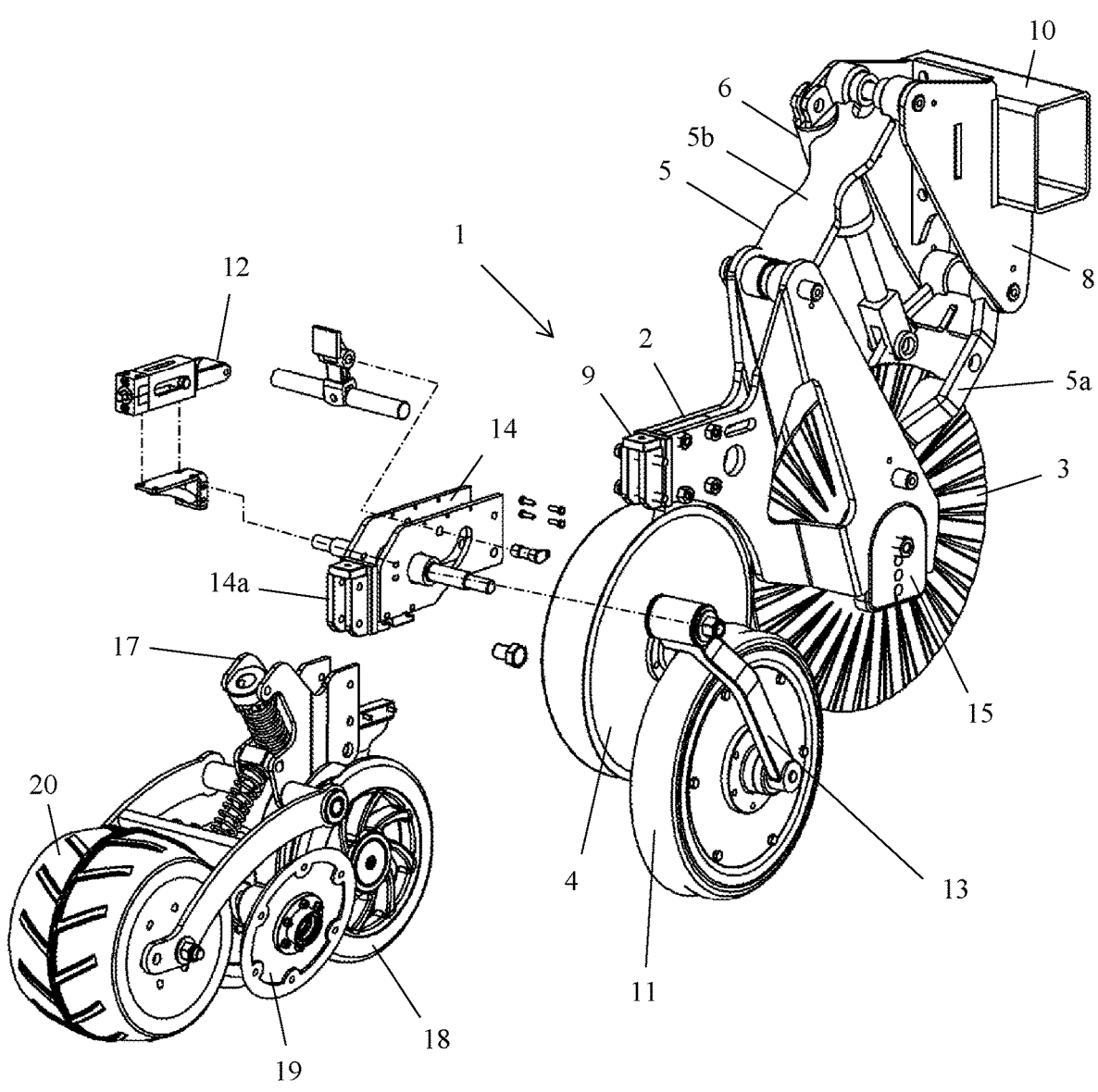
FIG. 5D shows a perspective and partially exploded view of the embodiment of the seeding assembly of FIG. 5A without the seed metering means.
Figure 5E:
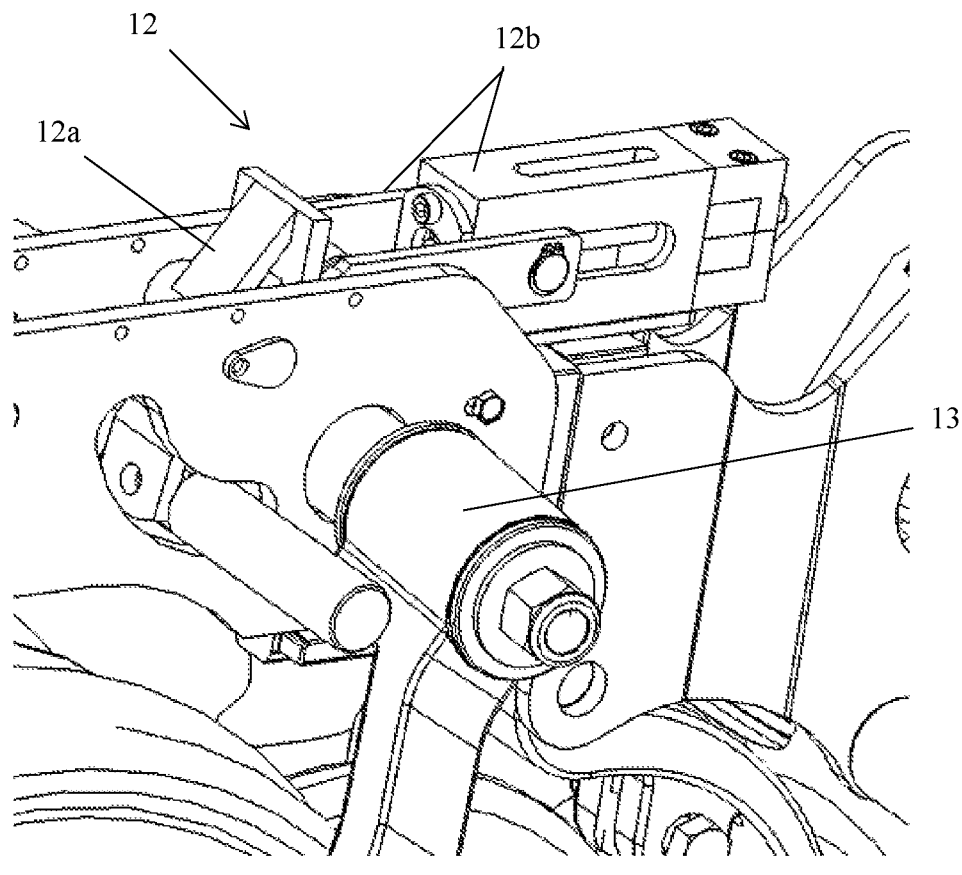
FIG. 5E shows a detailed view of the rocker arm support and regulation mechanism in the seeding assembly of FIG. 5A.
Figure 5F:
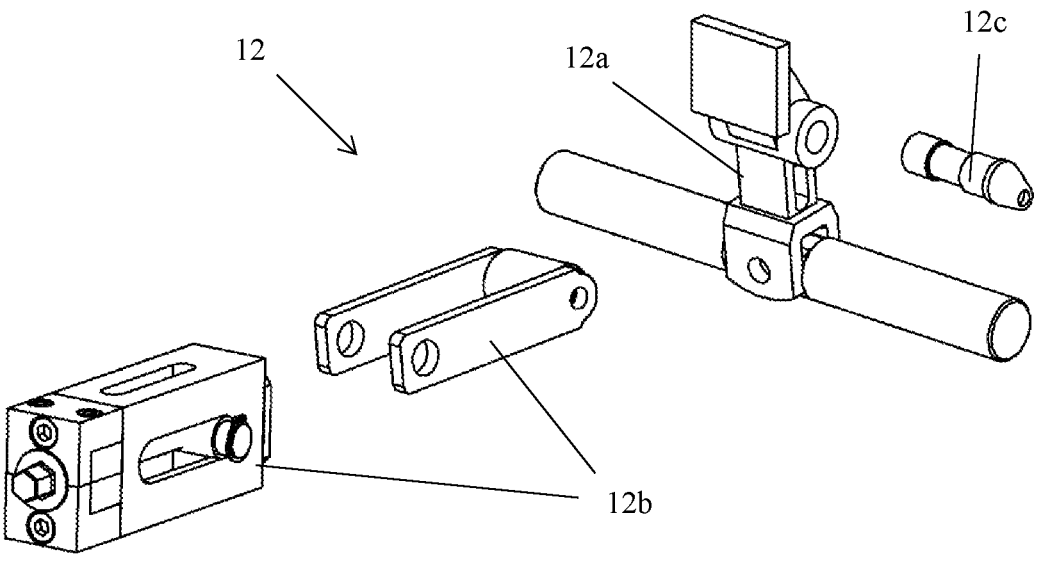
FIG. 5F shows an exploded perspective view of the rocker arm support and regulation mechanism of the embodiment of the seeding assembly of FIG. 5A.

It should be noted that, although in, for example, FIGS. 3A, 4A, and 4B, a body 17 is shown allowing for the attachment of means 19 and 20, the body 17 could be different to allow for the attachment of other additional elements and/or could have different elements attached to it than means 19 and 20 according to planting needs. Thus, a user can interchange, add, or remove elements from the body 17 according to their needs with minimal effort and time.

The support and junction module 14 allows, together with a rear section of the seeding frame 2, to mount on an upper surface thereof the rocker arm support and regulation mechanism 12. More precisely, it is on said rocker arm support and regulation mechanism 12 that the seed metering means 7 are mounted.

The seed metering means 7 can be pneumatic, mechanically or electrically controlled, and allow for variable seed metering, for example, according to a previous mapping.

The coupling means 9 and 14a allow the seeding assembly of the present invention to have in the same design a fully scalable and configurable body with a wide range of possibilities so that the producer can have in the same seeding assembly what the field requires according to the conditions of each season. In other words, these coupling means 9 and 14a allow the seeding frame to be equipped with the necessary conditions to fulfill all the functions required to perform the operations necessary for efficient planting regardless of the conditions of each season.

The seed securing means 18 can be a furrow press wheel (as shown in the figures, for example, in FIGS. 4A and 4B) or a beaver-type tail, which allow for securing the seed and ensuring contact of the seed with the soil in the planting furrow so that it can absorb the moisture and necessary nutrients for germination.

The furrow closing and ridge formation means 19 allow for closing the planting furrow, which becomes increasingly important as atmospheric conditions become more rigorous in terms of evaporation, and simultaneously the task becomes more difficult as soils become more clayey and wet.

The furrow closing and ridge formation means 19 also allow for loose soil to be applied in the form of an inverted "V" over the row, with the fewest possible air pockets. This breaks the soil capillarity and reduces water loss.

The furrow closing and ridge formation means 19 comprise closing wheels that can have smooth, beveled edges, or a toothed cap accessory, and they should have a sufficiently large diameter because if they are small, their rotation speed is high, and they can remove the soil along with the seed, especially in loose-textured soils.

Wheels with a toothed accessory generally perform well in clayey soils, as long as there is no excess moisture causing soil adherence, in which case beveled rubber wheels perform better.

Both the furrow closing and ridge formation means 19 and the soil compacting and flattening means 20 comprise respective load regulation systems in their connection with the body 17 to ensure proper contact with the soil. These load regulation systems preferably comprise coil springs.

Finally, the seeding assembly of the present invention allows to sow both coarse grains (such as corn, wheat, seeds, among others) and fine grains.

Referring to FIGS. 5A to 5D, another embodiment of the seeding assembly 1 for direct seeding of the present invention can be seen in these figures, this embodiment of the seeding assembly being identical to that described above and therefore having the same features (unless the context indicates otherwise), but with the only difference being that the depth regulating means comprising gauge wheels 11 are attached to the seeding assembly at a rear position thereof, specifically, at the support and junction module 14 (instead of being attached to the seeding frame as in the embodiment described above), through a respective support and pivot arm 13. For this purpose, this embodiment also differs from the one described above in the rocker arm support and regulation mechanism 12, clearly shown in FIGS. 5E and 5F.

Additionally, in this embodiment, the gauge wheels 11 are preferably at a distance of 502 mm from the first linkage means.

In any of the embodiments of the seeding assembly of the present invention described above, the pivot means of the seeding assembly, i.e., the parallelogram, have the dimensions shown in Table 1 below:

TABLE 1

| | a (mm) | b (mm) | f (mm) | e (mm) | r (mm) | $S_1$ (mm) |
|---|---|---|---|---|---|---|
| Minimum dimensions | 200 | 0 | 200 | 0 | 300 | 100 |
| Preferred dimensions | 330 | 210 | 310 | 264 | 320 | 120 |
| Maximum dimensions | 340 | 230 | 330 | 300 | 400 | 150 |

Figure 6A:
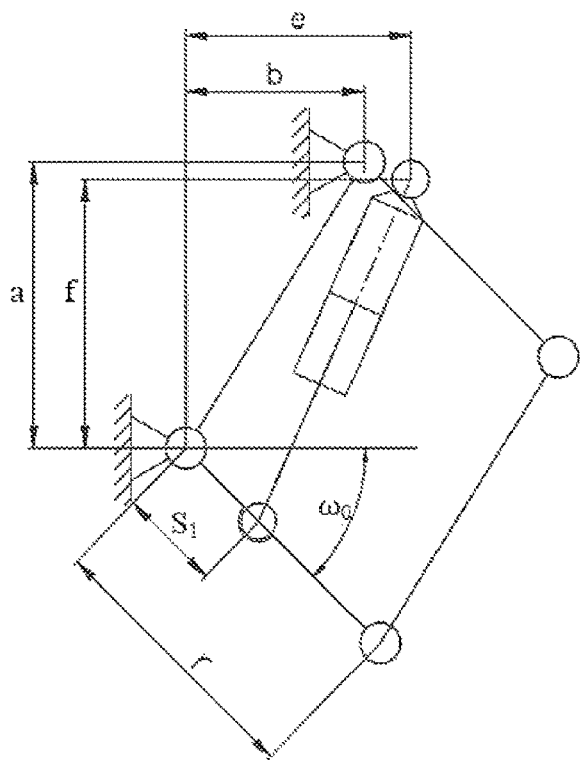
FIG. 6A shows a schematic drawing of the pivot means of the seeding assembly of the present invention along with their respective characteristic dimensions.

In particular, measurements a and b correspond to the vertical and horizontal distance, respectively, between the lower and upper linkage means of the support fixed to the chassis of the agricultural seeding machine. Measurements f and e correspond to the vertical and horizontal distance, respectively, between the lower linkage means and the point of attachment of the load generating means (i.e., the hydraulic actuator) with the support fixed to the chassis of the agricultural seeding machine. It should be noted that measurements f and e respectively coincide with a and b when the hydraulic actuator is centrally linked and aligned with the upper linkage means of the support. Lastly, measurement r corresponds to the length of the first and second pivot arms, and $S_1$ corresponds to the point of application of the load transmitted by the hydraulic actuator. Each of these measurements is schematically illustrated in FIG. 6A, which also depicts the angle $\omega_0$, corresponding to the angle formed between the pivot arms and a horizontal direction, with this angle being dependent on the undulations and irregularities of the terrain that cause the seeding frame of the seeding assembly to ascend or descend.

Figure 6B:
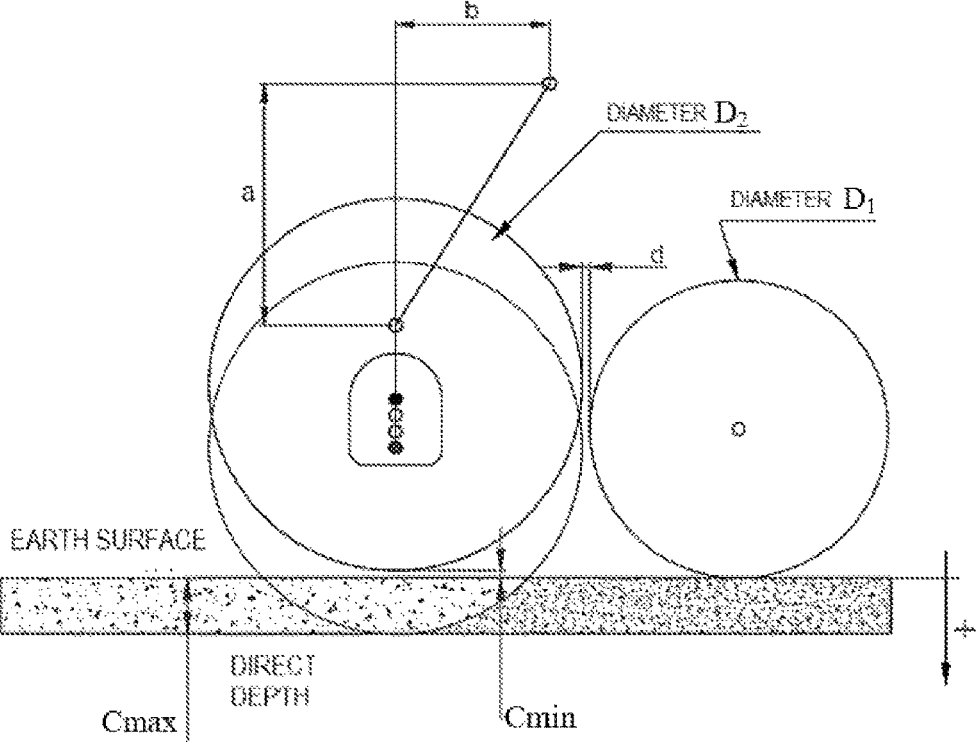
FIG. 6B shows a schematic drawing of the coulter blade and the furrow opening discs of the seeding assembly of the present invention along with their respective characteristic dimensions.

In any of the embodiments of the seeding assembly of the present invention described above, the furrow opening discs have a diameter D1 preferably between 15" and 16", and the coulter blade has a diameter D2 between 16" and 20", being preferable the use of coulter blades of 20" in diameter, as previously describe. Additionally, as described above, the coulter blade and the opening discs have a minimum spacing or distance d between them, between 10 mm and 62 mm, preferably 11 mm, because they are arranged in tandem on the same seeding frame; and they have a height difference c in contact with the ground surface with respect to the opening discs of the double disc assembly between −10 mm and 76 mm, preferably 0 mm, meaning that the opening discs and the coulter blade are at the same level with respect to the ground surface. FIG. 6B schematically illustrates the coulter blade (on the left) in two positions and the furrow opening discs (on the right) and each of the aforementioned dimensions. In particular, the coulter blade is shown in an upper position representing the minimum height difference c or Cmin, i.e., being 10 mm above the ground surface, and a lower position representing the maximum height difference c or Cmax, i.e., being 76 mm below (or within) the ground surface.

Finally, in any of the embodiments of the seeding assembly of the present invention described above, the furrow opening discs of the double disc assembly that perform the cutting of the planting furrow in a "V" shape are inclined both with respect to a vertical direction and a horizontal direction as described earlier. In particular, these furrow opening discs are inclined between 3° and 6°, preferably 5°, with respect to a horizontal direction (i.e., a direction parallel to the direction of advancement of the seeding assembly); and they are inclined between 0° and 5°, preferably 3°, with respect to a vertical direction (i.e., a direction perpendicular to the direction of advancement of the seeding assembly).

The invention claimed is:

1. A seeding assembly for direct seeding comprising:
a support attached to a chassis of a seeding machine;
a hydraulic cylinder comprising an upper part and a rod; and
a seeding frame supporting a coulter blade and a double disc assembly comprising two furrow opening discs, the coulter blade and the double disc assembly being in a tandem arrangement, with minimum distance or spacing therebetween, and the coulter blade being partially located within the seeding frame,
wherein the seeding frame is attached to the support through a parallelogram system, said parallelogram system comprising a first pivot arm and a second pivot arm, and said first pivot arm being located below the second pivot arm,
wherein the hydraulic cylinder is located on a lateral side of the parallelogram system, the upper part of the hydraulic cylinder being linked to the support and the rod of the hydraulic cylinder being linked to the first pivot arm, allowing the hydraulic cylinder to transmit load to the seeding frame through said first pivot arm of the parallelogram system, and
wherein the coulter blade is partially located between the first pivot arm and the second pivot arm of the parallelogram system allowing the load applied to the seeding frame to concentrate more on the coulter blade so that said coulter blade penetrates the soil.

2. The seeding assembly according to claim 1, wherein the seeding frame comprises at least one coupling means allowing to couple additional seeding accessories.

3. The seeding assembly according to claim 2, wherein the coupling means allow coupling accessories selected from the group consisting of seed metering means, seed securing means, furrow closing and ridge forming means, and soil compacting and flattening means.

4. The seeding assembly according to claim 1, wherein the seeding frame comprises depth regulating means comprising gauge wheels, a rocker arm support and regulation mechanism, and a rocker arm.

5. The seeding assembly according to claim 4, wherein the depth regulating means further comprise a load sensor located in the rocker arm support and regulation mechanism that controls and regulates the load exerted by the load generating means.

6. The seeding assembly according to claim 1, wherein the coulter blade has a diameter between 16" and 20".

7. The seeding assembly according to claim 6, wherein the coulter blade has a diameter of 20".

8. The seeding assembly according to claim 1, wherein the coulter blade is attached to the seeding frame through tapered roller bearings.

9. The seeding assembly according to claim 1, wherein the seeding frame comprises position regulating means for the coulter blade, said position regulating means comprising a plurality of vertically spaced holes.

10. The seeding assembly according to claim 9, wherein the position regulating means allow a height difference in contact with the soil surface between the coulter blade and the furrow opening discs, said height difference being between −10 mm and 76 mm.

11. The seeding assembly according to claim 10, wherein the height difference is 0 mm.

12. The seeding assembly according to claim 1, wherein the minimum distance or spacing between the coulter blade and the double disc assembly is between 10 mm and 62 mm.

13. The seeding assembly according to claim 12, wherein the distance between the coulter blade and the double disc assembly is 11 mm.

* * * * *